United States Patent [19]

Rahlfs

[11] 4,171,193

[45] Oct. 16, 1979

[54] APPARATUS FOR THE PRODUCTION OF SHAPED STRANDS OF THERMOPLASTIC SYNTHETIC-RESIN MATERIAL

[75] Inventor: Herbert K. Rahlfs, Troisdorf-Sieglar, Fed. Rep. of Germany

[73] Assignee: Reifenhauser KG, Troisdorf, Fed. Rep. of Germany

[21] Appl. No.: 865,502

[22] Filed: Dec. 29, 1977

[30] Foreign Application Priority Data

Jan. 3, 1977 [DE] Fed. Rep. of Germany ....... 2700003

[51] Int. Cl.² .............................................. B29D 23/04
[52] U.S. Cl. ..................................... 425/71; 264/40.7; 425/140; 425/144; 425/145; 425/325; 425/376 A; 425/377; 425/404; 425/466; 425/817 C
[58] Field of Search ............... 264/40.7, 209; 425/205, 425/376 A, 145, 144, 149, 141, 381, 466, 404, 71, 4 C, 325, 327, 817 C, 377, 140

[56] References Cited

U.S. PATENT DOCUMENTS

| 2,162,482 | 6/1939 | Hanna | 425/145 X |
| 3,078,513 | 2/1963 | Levison et al. | 425/376 A X |
| 3,148,231 | 9/1964 | Spencer | 425/145 X |
| 3,265,786 | 8/1966 | Voelker | 425/4 C X |
| 3,890,078 | 6/1975 | Straumanis | 264/40.7 |

FOREIGN PATENT DOCUMENTS 46-22595  6/1971 Japan ...................................... 425/145

Primary Examiner—Roy Lake
Assistant Examiner—Mark Rosenbaum
Attorney, Agent, or Firm—Karl F. Ross

[57] ABSTRACT

A metering pump whose speed is controlled in accordance with product data is provided between an extrusion press and the extrusion die. The speed of the worm is controlled by a pressure/speed regulator and the temperature at the outlet side of the press is maintained constant within ±10° C.

10 Claims, 3 Drawing Figures

4,171,193

APPARATUS FOR THE PRODUCTION OF SHAPED STRANDS OF THERMOPLASTIC SYNTHETIC-RESIN MATERIAL

FIELD OF THE INVENTION

The present invention relates to an apparatus for producing shaped strands of synthetic-resin material and, more particularly, profiled extrusions of predetermined shape and size from thermoplastic synthetic-resin material.

BACKGROUND OF THE INVENTION

It is known to provide shaped elongated bodies, especially continuous strands, from thermoplastic synthetic-resin material by plastifying the thermoplastic synthetic resin in a worm-type extrusion press, to force the material through a sieve or like perforated body to degas the material and ensure homogenization thereof, to pass the plastic mass through a die or tool having an aperture of the desired shape, to regulate this profile shape by calibration, tempering and/or cooling or stretching, and to draw the continuous extrusion through a sequence of apparatus units having the aforedescribed function. The term "profiled extrusion" is here used in its most general sense to refer to elongated bodies with angular, prismatic or round cross section and is intended to include tubes or pipe of any cross section. The term is also employed to refer to elongated flat strips, synthetic-resin foils and the like.

In conventional apparatus for this purpose, the worm-rotation speed controller and the extrusion-drawing apparatus are functionally independent from one another at least with respect to the associated control units. The setpoint values of these control systems are, on the one hand, the rate of feed of the synthetic-resin material and, on the other hand, the dimensions of the profiled strand to be produced.

While it can be conceived that the two control units can be functionally related or coupled, the prior art systems have never been able to produce a product of given configuration, dimensions and like parameters in a continuous and reproducible manner within narrow tolerances. The sole purpose of functionally connecting the two control systems in earlier arrangements has been to ensure that the product output per unit time, in terms of the mass of the synthetic resin, remains constant so that the same volume of thermoplastic material passes through all parts of the apparatus per unit time.

OBJECTS OF THE INVENTION

It is the object of the present invention to provide an apparatus for the production of continuous extrusions and especially profiled strands of any shape or size which avoids the disadvantages of earlier systems in a convenient and economical manner. It is also an object of the invention to provide and improved and inexpensive control system for an extrusion-producing apparatus which enables the production of extruded profiles whose actual or measured product data corresponds within extremely narrow tolerance limits to the predetermined setpoint values of the product data.

SUMMARY OF THE INVENTION

These objects and others which will become apparent hereinafter are attained in a system which combines the following features:

(a) between the synthetic-resin extrusion or worm press and the extrusion die, there is provided a rotary dosing or metering pump whose rotary speed is controlled by a regulator or computer in accordance with the desired or setpoint product data while the extrusion-withdrawing controller is regulated in dependence upon the rotary speed of this dosing or metering pump;

(b) the extruder-speed controller is designed for pressure/rotary speed control and responds to an instantaneous-value sensor disposed along the flow path of the synthetic-resin material between the dosing or metering pump and the extrusion press; and (c) independently of points (a) and (b), the temperature of the mass upon exiting from the extrusion press is maintained constant within ±10° C.

When reference is here made to product data, it is intended to include thereby the dimensions, density, mass per unit length and volume of the extrusion which is produced or which is to be produced.

In completely different processes, namely those used to produce monofilament threads with the aid of so-called spinnarets or spinning nozzles, it is known to feed the spinning nozzles with a dosing or metering pump. This has no effect, however, in maintaining low tolerance limits of the final product and simply is a convenient way of supplying the nozzles. As a practical matter, the manufacture of monofilaments by this technique involves numerous tolerance problems which have not been solved by the use of the dosing or metering pump.

The computer, programmer or regulator of the present invention is constituted as a process regulator which receives input variables such as the aforedescribed product data in such form as to correspond to the optimum output of the apparatus. The result is an optimum production rate of an extruded product which has its dimensions and other characteristic within the aforedescribed narrow tolerance limits.

The extruder must be correspondingly designed with respect to the optimum product and product data or the optimum product and product data must be selected in accordance with the particular extruder design and dimensions used.

To obtain the setpoint values of the data and the operating parameters of the extruder, each product and apparatus msut be experimentally tested. In other words, for each product and each apparatus, experiments must be conducted to provide the respective data and parameters.

The invention is based upon the recognition that, in apparatus for the production of extruded profiles with predetermined setpoint product data from thermoplastic synthetic resin, the control cannot be satisfactorily managed if rheological parameters constitute the setpoint value and actual or measured value or, more generally, the control parameters. This is because the rheological parameters cannot be measured sufficiently rapidly, conveniently or effectively during the operation of the extruder.

Hence the invention does not operate with rheological parameters but rather makes use of parameters which can be mechanically and classically measured or detected without difficulty.

In spite of the fact that classical mechanical parameters are used in the control of the apparatus of the present invention, it has been found that it gives rise to satisfactorily narrow tolerance limits at the product end of the apparatus. In this connection, it has been observed, quite surprisingly, that variations of the mass temperature at the discharge side of the extrusion press are permissible within the range of ±10° C. While fluctuations of the temperature of the synthetic-resin material within this range do give rise to fluctuations in volume, these can be compensated by controlling the feed rate to the die with the dosing or metering pump.

Naturally, the extrusion press which feeds this pump, must be dimensioned and/or operated at such a rate that the metering or dosing pump is continuously filled with the thermoplastic material.

The dosing or metering pump has an exact output from a volumetric point of view per revolution. Advantageously, the metering pump is a continuously controlled and continuously operating pump, preferably a gear pump. Other positive-action or positive-displacement pumps having the same type of output, may also be used.

Not only is it desirable, within the principles of the present invention, to maintain the mass temperature at the discharge end of the extrusion press constant within the range of ±10° C., but it is also desirable to provide the regulator with a temperature control means which regulates the temperature of the extrusion press in dependence upon the desired product data and the worm speed, taking into consideration the limiting range of variation of the temperature.

An optimization of the process to minimize the tolerances of the product data can be effected, in addition, with three further control points of the system. These three control operations can be carried out individually or in combination.

The first of these corrections is afforded in that the controller is provided with a metering-pump correcting device which has, as its instantaneous value input, a temperature sensor disposed between the extrusion press and the metering pump and responding to the temperature of the synthetic-resin mass. A further correction is afforded by a slip controller with which the regulator is provided and which receives an actual value signal from a sensor responsive to the output rate of the product and hence the production speed.

The regulator can additionally be provided with a dimension controller which responds to the dimensions of the product between the extrusion-withdrawing unit and the setting or calibrating unit.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
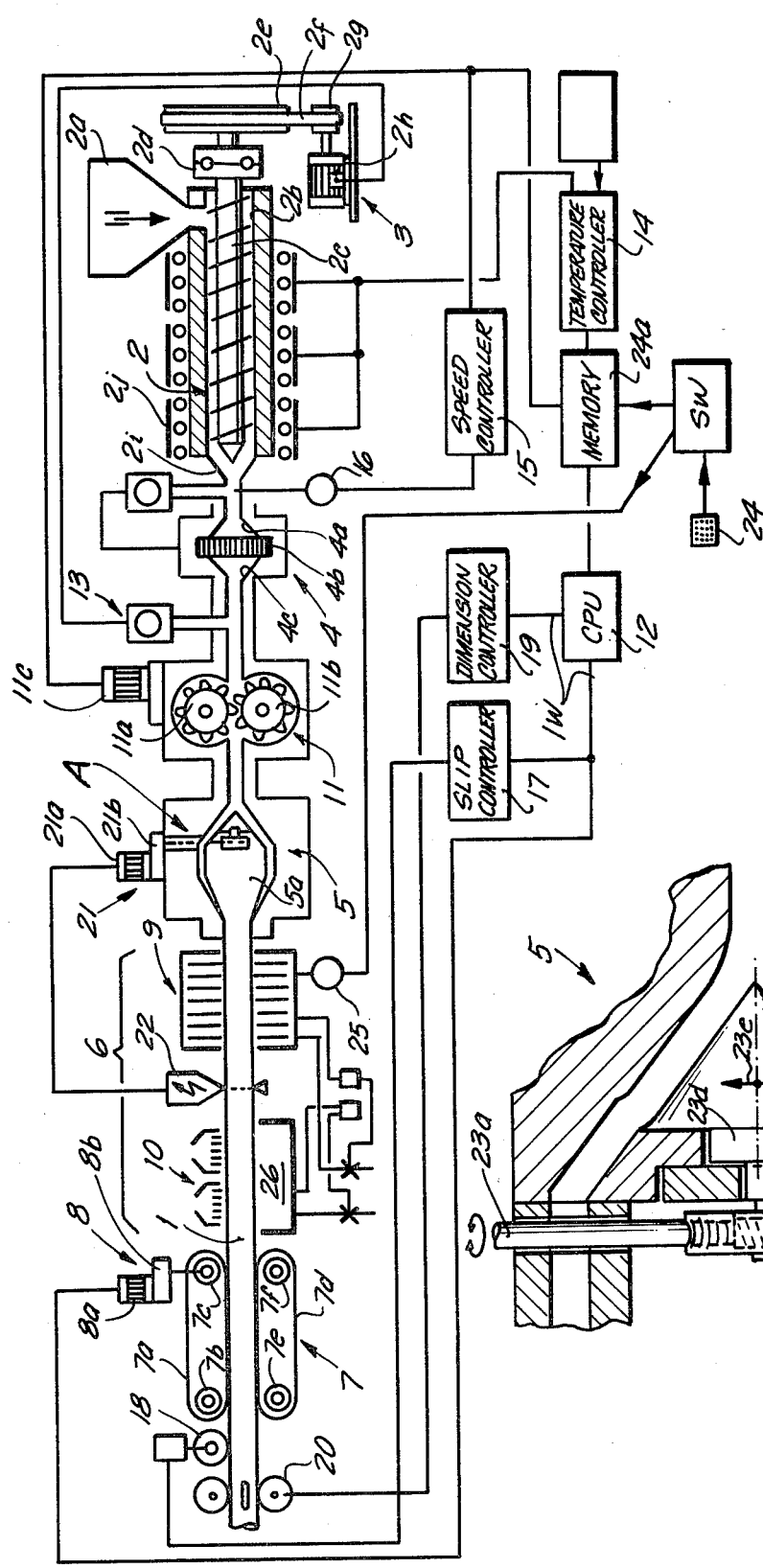
FIG. 1 is a diagrammatic side-elevational view of an apparatus for producing extruded profiles according to the invention with portions of the control system shown in block diagram form.

The apparatus shown in FIG. 1 for the production of synthetic-resin profiles 1 of thermoplastic material comprises an extrusion press 2 of the worm type, a worm-speed control device 3 and a sieve arrangement downstream of the outlet of the extruder 2.

The extruder 2 comprises a hopper 2a into which the synthetic-resin material is introduced and leading into the interior of a cylinder 2b in which a worm 2c is rotatable in a bearing 2d by a V-belt pulley 2e driven by a belt 2f from the V-belt pulley 2g of the motor 2h which affords control of the speed of the worm 2c. The cylinder 2b converges at its end 2i to form a constricted outlet for the synthetic-resin material. In addition, the cylinder 2b is surrounded by a heating mantle 2j which may be subdivided along its length to permit control of the various sections separately.

The sieve device 4 comprises a diverging passage 4a in the direction of synthetic-resin flow, this diverging passage being obstructed by a perforated plate 4b, the perforations of which lead into a converging passage 4c.

The synthetic-resin material also passes through a profile former which has been represented generally at 6 and the extruded product is drawn from the system by a withdrawal unit 7 provided with a driver represented at 8. This withdrawal unit 7 can comprise an upper conveyor belt 7a passing over rollers 7b and 7c, the latter being driven by the motor 8a of the drive and control arrangement 8 via a speed-reduction gear 8b. A lower conveyor belt 7d of the withdrawal device supports the extrusion and passes over a pair of rollers 7e and 7f.

When the apparatus is used for the production of synthetic-resin tubes or pipes, the profile former 6 can comprise a calibrating device 9 for establishing the external diameter of the pipe and can include, of desired, any conventional internal or bore calibration device. Downstream of the calibration device 9, there is provided a tempering unit 10 which is water cooled. A die 5 is disposed between the calibrating device 9 and the extruder 2. The die 5 can include a core member or mandrel 5a around which the synthetic-resin material passes uniformly.

According to the principles of the present invention, between the extruder 2 and the die 5, there is provided a metering or dosing pump 11 which, in the embodiment illustrated, is a gear pump whose gears 11a and 11b are driven by a motor 11c simultaneously serving to control the rate at which the synthetic-resin material is advanced by the pump.

The speed of the metering pump 11 is controlled by a central processing unit 12 in which the desired product data has been stored. The central processing unit 12 also controls the withdrawal controller 8 in dependence upon the speed of the metering pump 11.

Basically independent of the output of the controller 12, is the speed regulator 3 of the extruder 2. This speed regulator is controlled by an actual value signal which is detected by a pressure sensor 13 connected to the synthetic-resin passage between the perforated plate 4b and the metering pump 11. The control unit 3 is thus a pressure/speed regulator.

Independent from the foregoing, the temperature of the synthetic-resin mass at the outlet of the extrusion press 2 is held constant within ±10° C. The temperature of the thermoplastified mass emerging from the extrusion press 2, is thus the usual thermoplastic synthetic-resin temperature employed for extrusion, held within the limits described. In addition, a temperature control device 14 can be connected to the calculator 12 to regulate the temperature of the synthetic-resin material at the heating mantles 2j in accordance with the product data and the worm speed.

In accordance with a preferred feature of the invention, the computer 12 additionally controls a metering pump correcting unit 15 which is connected between the outlet of the extrusion press and the servomotor 11c of the metering pump 11. The input to the speed controller 15 can be an actual value signal from a temperature sensor 16 responsive to the temperature of the synthetic-resin mass to vary the speed of the pump 11 in dependence upon the difference between the desired or setpoint temperature and the actual value temperature of the thermoplastified synthetic resin at the outlet of the extruder.

To the extent that slip can develop between the withdrawal device 7 and the extruded profile 1, the computer 12 additionally is connected with a slip controller 17 which regulates the speed of the belts 7a and 7d via the motor unit 8, the slip controller 17 receiving its actual-value signal from a sensor 18 which measures the output speed of the product. In this case, the difference between this product speed and the withdrawal speed is monitored and can be used to control the speed of the metering pump 11.

In a similar manner, the computer 12 can be connected to a dimension controller 19 which has, as its input, a measuring device 20 responsive to the actual measurement of the dimensions of the extrusion. The measuring device 20 provides the actual-value input for the dimension controller which works into the computer 12. The output of the computer can be applied to adjust the die 5.

Figure 2:
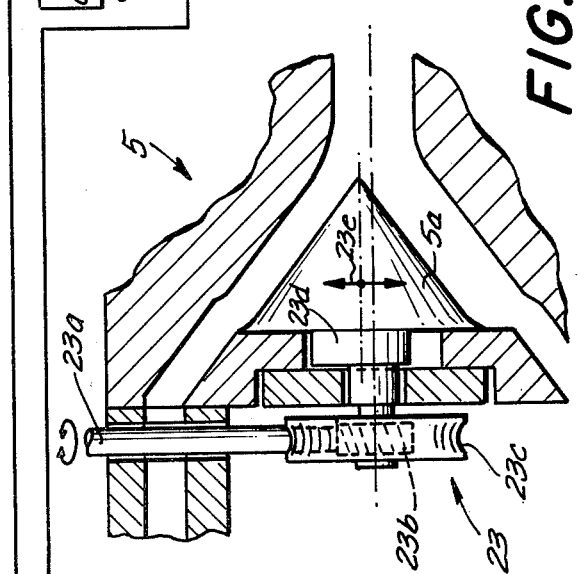
FIG. 2 is an axial cross-sectional view of the detail A of the apparatus of FIG. 1.

It has also been found to be advantageous, when the extrusion must have a predetermined wall thickness, to provide means such as a sensor 22 of the radioactive or other electronic type for detect-the-wall thickness downstream of the calibrater 9. The thickness-measuring device 22 can be connected to a wall-thickness controller 21 whose motor 21a acts via a speed-reducing gearing 21b on a shaft 23a (FIG. 2). The shaft 23a carries a worm 23b which drives a worm wheel 23c rotatable on a crank 23d which displaces the mandrel 5a as represented by the arrow 23e to adjust the wall thickness. The eccentric drive as a whole has been represented at 23 in FIG. 2.

The setpoint values, i.e. the desired product data, are introduced into the system as represented by the block SW (FIG. 1), e.g. by perforated cards, magnetic tape or other data carrier as represented at 24. The memory of the system which is tapped by the central processor unit 12, is represented at 24a. Instantaneous values or actual-value signals have been designated at IW.

Figure 3:
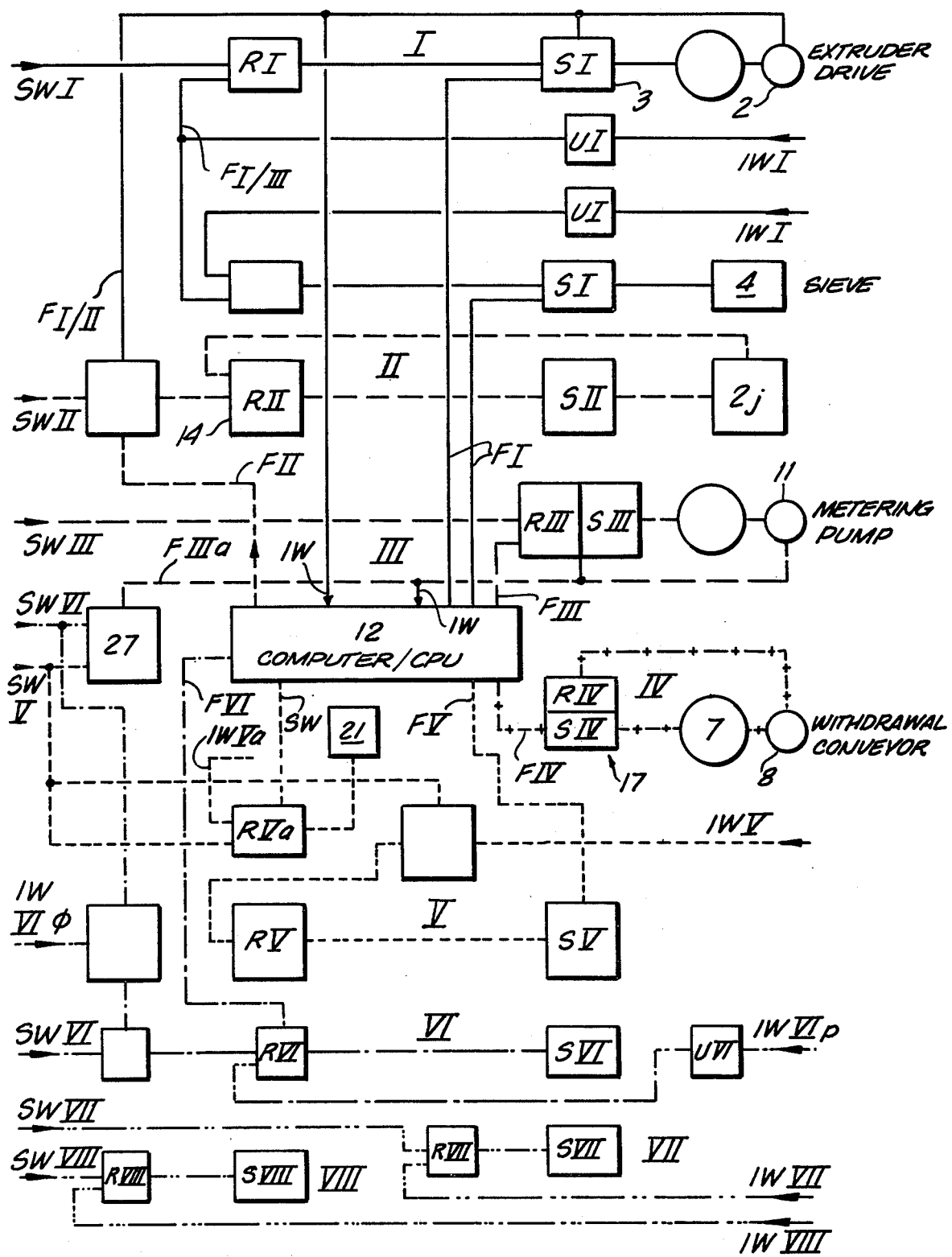
FIG. 3 is a block diagram of the control system for the apparatus of FIG. 1.

The block diagram of FIG. 3 shows the control system in greater detail.

In this Figure reference numerals corresponding to those already used in FIG. 1, have been retained for clarity of explanation. The system comprises eight control circuits or paths represented at I–VIII, respectively, with each path including a setpoint input SW, a respective controller R, and a respective follower or setting member represented at S in accordance with conventional servo-mechanism practices.

These circuits are the following:

A. The control path I for pressure/speed regulation of the worm of the extrusion press receives a setpoint value SWI corresponding to the optimum speed to maintain the synthetic-resin output rate sufficient to fill the pump 11. This setpoint value is applied to the controller RI which regulates the speed of the pump by operating upon its drive motor 3. In addition, this control path controls the automatic clearing or replacement of the sieve 4.

B. Analogously, the control path II receives a setpoint value representing the desired temperature (±10° C.) of the synthetic-resin material emerging from the extrusion press 2 and is provided with the usual controller acting ultimately upon the heaters represented at 2j.

C. The control path III receives a setpoint value SWIII for the feed of the dosing pump and controls the latter.

D. The control path IV regulates the withdrawal speed.

E. The control path V includes the setpoint source and actual-value input for control of the wall thickness.

F. The control path VI is provided for regulating the vacuum in the vacuum calibrating device 9.

G. The control path VII is provided for temperature regulation within the vacuum tank 25.

H. The control path VIII affords temperature regulation in the water bath 26 which is used for the cooling of the extruded product.

The various piping arrangements for the vacuum and water sources and recirculation of water have not been shown in detail and are conventional in the art.

Thus, each control path comprises a regulator R, which can include a comparator, a setting member S which responds to an error signal and a source of setpoint values SW. The paths of the instantaneous values or actual values with which the setpoints are compared, are represented at IW and, in so far as measurement converters are required, these have been illustrated in the block diagram of FIG. 3 by the latter U followed by the Roman numeral representing the particular path. The control paths I–VI are functionally tied, as represented by the designations F (followed by appropriate Roman numerals), with the central processor unit or computer 12 to which the desired product data is supplied.

In the embodiment illustrated, the control paths VII and VIII are independent of the computer 12.

The control path II for the temperature of the synthetic-resin press 2 and the control path III for the control of the speed fo the metering pump 12 are connected together as illustrated by the functional connections FI/II and FI/III.

The computer 12 also includes a unit 27 in which the diameter setpoitn value SW4 and the wall thickness setpoint value SWV is combined with other product data and the output of which is applied to the controller RIII for the speed of the metering pump.

I claim:

1. An apparatus for producing continuous extrusions having predetermined desired product data from a thermoplastic synthetic resin, comprising:
   an extrusion press provided with a speed controller for extruding a thermoplastified stream of synthetic-resin material;
   a metering pump downstream of said extruder for displacing said thermoplastified material at a rate dependent upon the speed of said pump;
   an extrusion die downstream of said pump and traversed by said material to form said extrusion;
   a withdrawal device downstream of said die for drawing the extrusion away from said die;
   first control means operatively associated with said extruder for regulating the speed of said extruder;
   second control means operatively associated with said pump for regulating the speed of pump;

third control means operatively associated with said withdrawal device for regulating the speed of said withdrawal device; and a computer means storing the desired product data and controlling said second control means, said withdrawal device being controlled at least in part in dependence upon the speed of said pump.

2. The apparatus defined in claim 1 wherein said first control means is a pressure/speed controller responsive to a pressure sensor monitoring the pressure of the synthetic-resin material between said pump and said extrusion press.

3. The apparatus defined in claim 2, further comprising means for maintaining the temperature of the synthetic-resin material at the outlet of said extrusion press constant within tolerance limits of ±10° C.

4. The apparatus defined in claim 3 wherein said means for maintaining the temperature constant includes temperature-control means along said press responsive to the speed of said press via said computer means.

5. The apparatus defined in claim 3 wherein said computer means includes means responsive to the temperature of said material between said press and said pump for correcting the speed of said pump.

6. The apparatus defined in claim 3 wherein said computer means includes a slip controller for said withdrawal device responsive to the output speed of an extrusion downstream of said device.

7. The apparatus defined in claim 3 wherein said computer means includes a dimension controller responsive to the dimensions of an extrusion between said die and said device.

8. The apparatus defined in claim 7, further comprising means on said die responsive to said computer means for modifying the dimensions of an extrusion emerging therefrom.

9. The apparatus defined in claim 8, further comprising a sieve along the path of said material between said press and said pump.

10. The apparatus defined in claim 9, further comprising calibrating means downstream of said die for imparting an external dimension to said extrusion in response to said computer means, and means downstream of said calibrating means and upstream of said device for cooling said extrusion.

* * * * *